Figure 2:
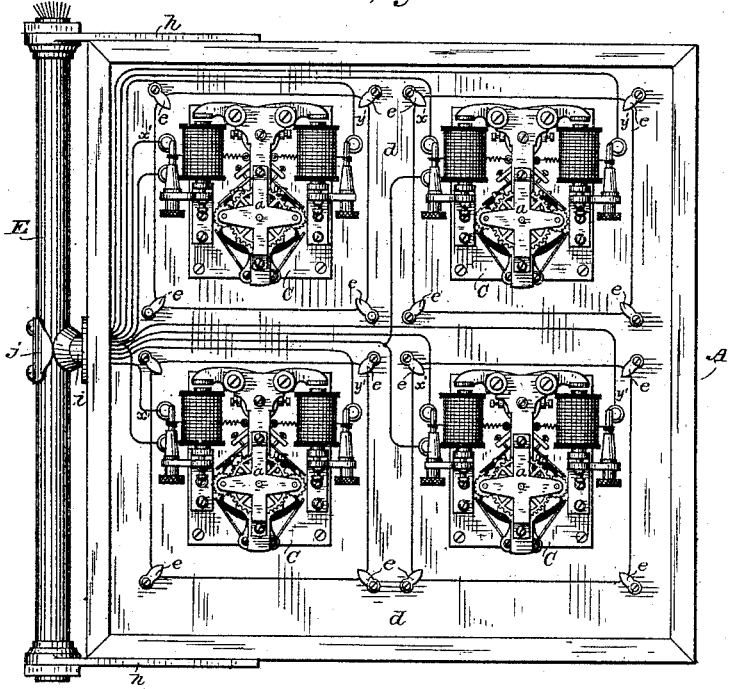

(No Model.) 12 Sheets—Sheet 1.
H. J. HAIGHT.
SYSTEM FOR INDICATING THERMOMETRIC RECORDS.
No. 442,880. Patented Dec. 16, 1890.
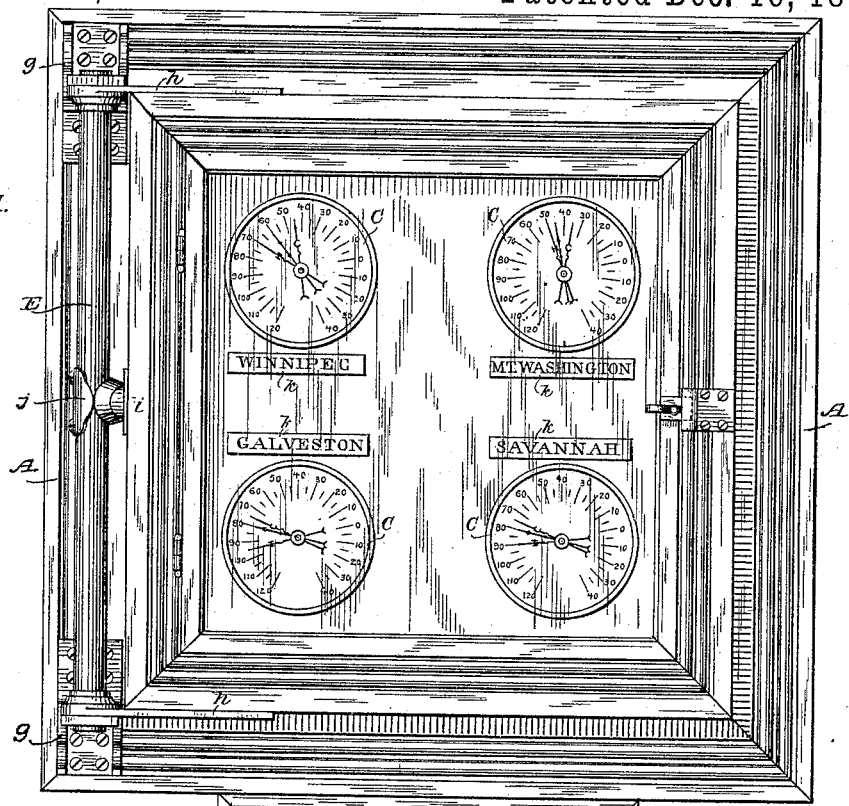
Fig. 1.
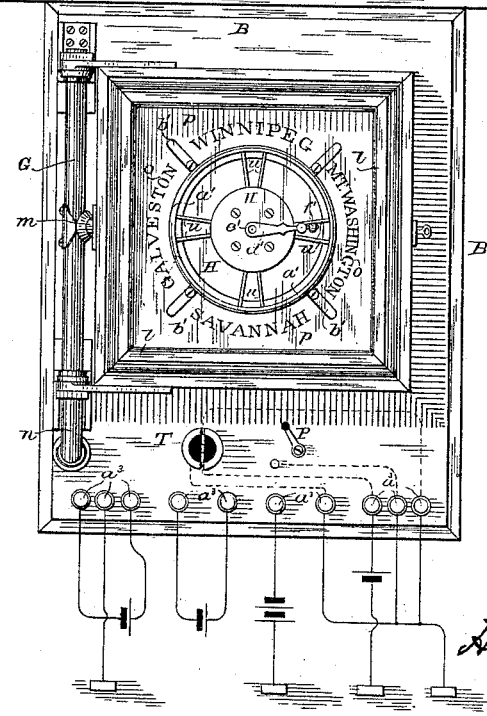
Witnesses
Jos. S. Latimer
A. S. Browne
Inventor
Henry James Haight
By J. D. Brown
his Atty.

(No Model.)

H. J. HAIGHT.

SYSTEM FOR INDICATING THERMOMETRIC RECORDS.

No. 442,880. Patented Dec. 16, 1890.

(No Model.) 12 Sheets—Sheet 3.

H. J. HAIGHT.
SYSTEM FOR INDICATING THERMOMETRIC RECORDS.

No. 442,880. Patented Dec. 16, 1890.

(No Model.)  12 Sheets—Sheet 4.

H. J. HAIGHT.
SYSTEM FOR INDICATING THERMOMETRIC RECORDS.

No. 442,880. Patented Dec. 16, 1890.

Witnesses  Inventor (No Model.) 12 Sheets—Sheet 6.

H. J. HAIGHT.
SYSTEM FOR INDICATING THERMOMETRIC RECORDS.

No. 442,880. Patented Dec. 16, 1890.

Witnesses
Jos. S. Latimer
Carleton E. Snell

Inventor
Henry J. Haight
by Arthur Browne
his Attorney

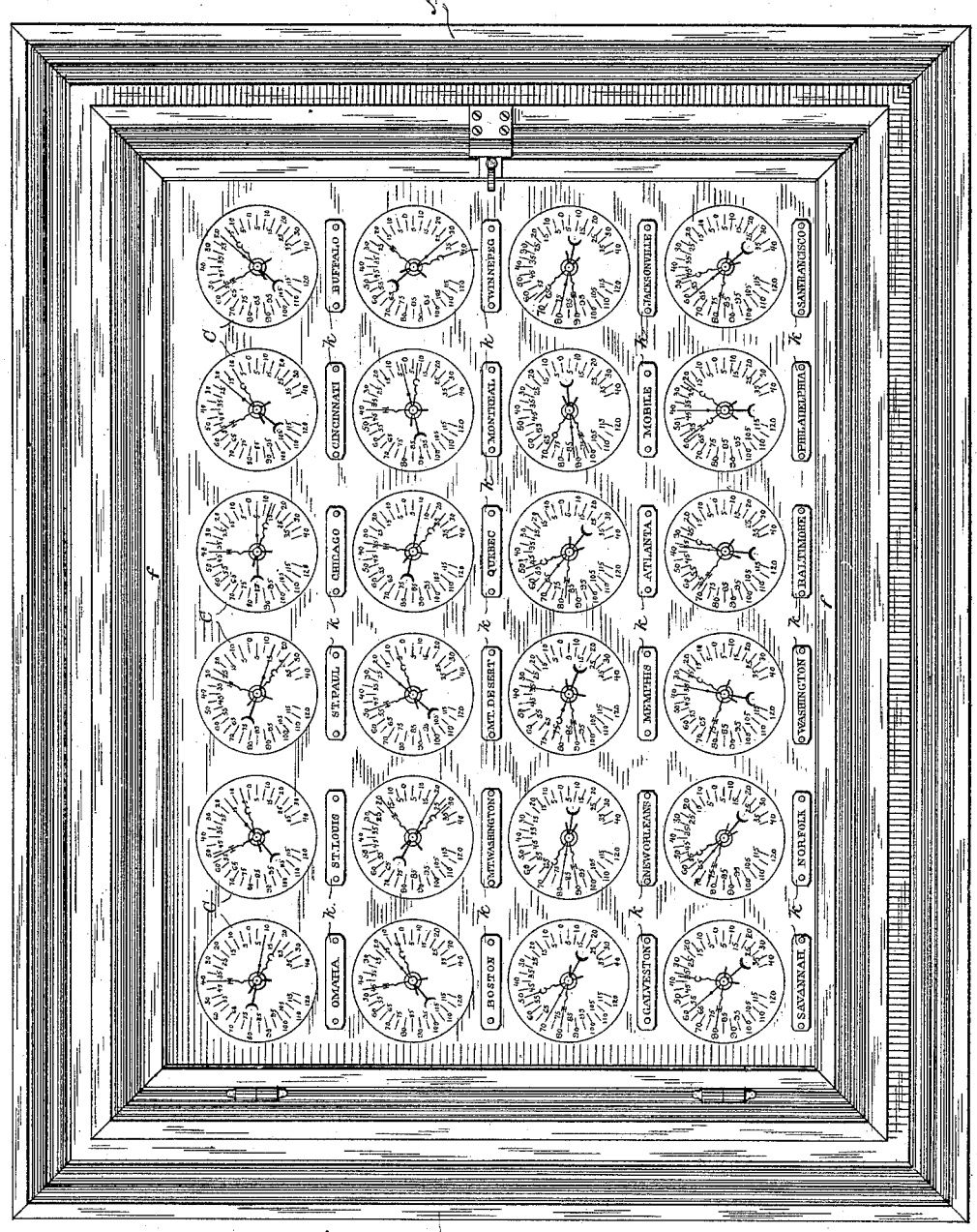

(No Model.)
H. J. HAIGHT.
SYSTEM FOR INDICATING THERMOMETRIC RECORDS.
No. 442,880. Patented Dec. 16, 1890.
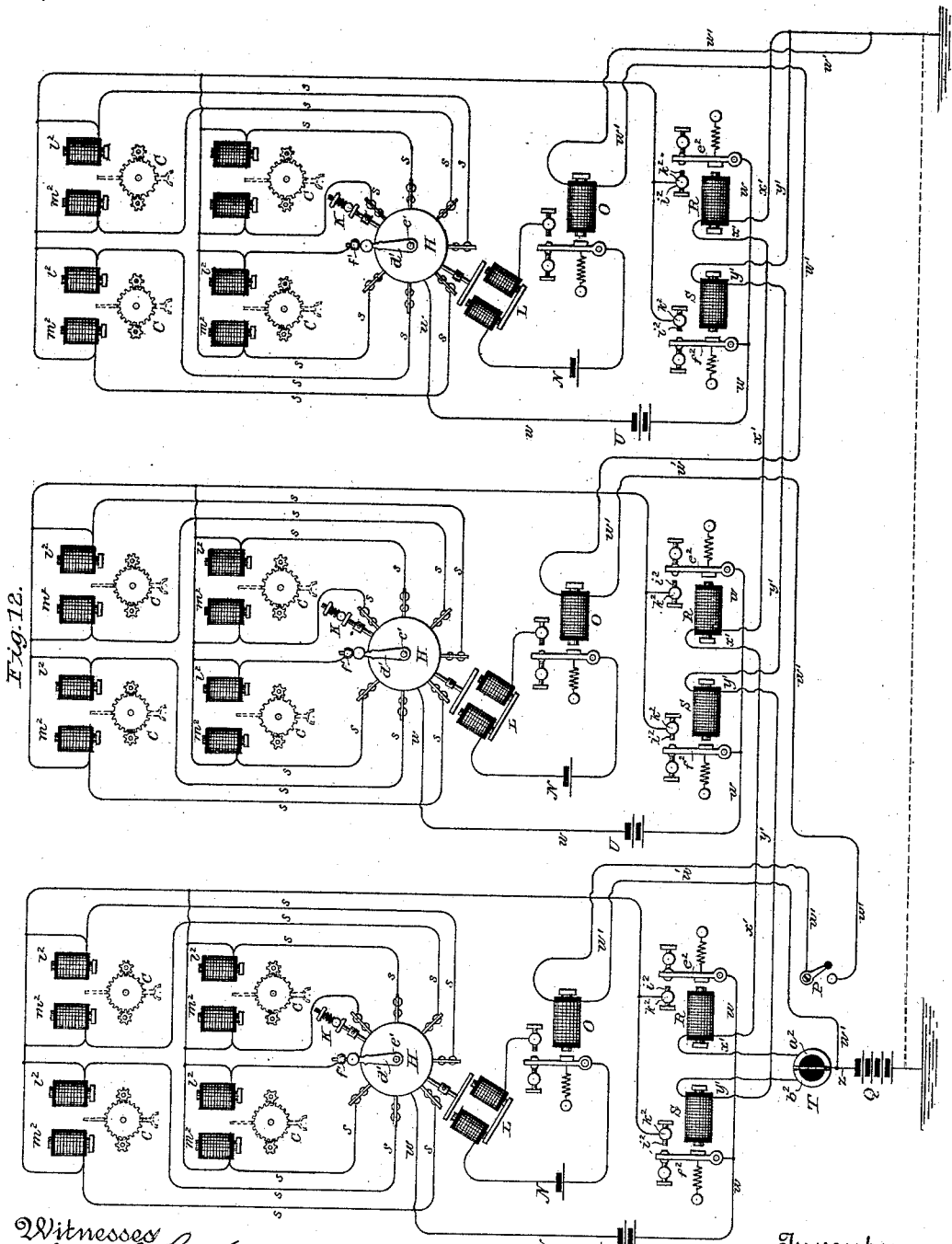
Witnesses
Jos. S. Latimer
A. B. Browne
Inventor
Henry Jansen Haight
By J. T. Brown
his Attorney.

(No Model.)
12 Sheets—Sheet 9.

H. J. HAIGHT.
SYSTEM FOR INDICATING THERMOMETRIC RECORDS.

No. 442,880. Patented Dec. 16, 1890.

Witnesses
Jos. S. Latimer
A. S. Browne.

Inventor,
Henry Jansen Haight,
By J. S. Brown,
his Attorney.

(No Model.)

H. J. HAIGHT.
SYSTEM FOR INDICATING THERMOMETRIC RECORDS.

No. 442,880. Patented Dec. 16, 1890.

Witnesses
Jos. S. Latimer
A. S. Browne

Inventor
Henry Jansen Haight,
By J. S. Brown,
his Attorney.

(No Model.)　　　　　　　　　　　　　　　　　　12 Sheets—Sheet 11.
H. J. HAIGHT.
SYSTEM FOR INDICATING THERMOMETRIC RECORDS.
No. 442,880.　　　　　　　　　　Patented Dec. 16, 1890.

(No Model.)   12 Sheets—Sheet 12.

H. J. HAIGHT.
SYSTEM FOR INDICATING THERMOMETRIC RECORDS.

No. 442,880. Patented Dec. 16, 1890.

Witnesses
Jos. S. Latimer
A. P. Browne

Inventor
Henry Jansen Haight
By J. S. Brown,
his Attorney.

UNITED STATES PATENT OFFICE.

HENRY JANSEN HAIGHT, OF NEW YORK, N. Y.

SYSTEM FOR INDICATING THERMOMETRIC RECORDS.

SPECIFICATION forming part of Letters Patent No. 442,860, dated December 16, 1890.

Application filed May 3, 1888. Serial No. 272,748. (No model.)

*To all whom it may concern:*

Be it known that I, HENRY JANSEN HAIGHT, a citizen of the United States, residing in the city, county, and State of New York, have invented a new and Improved System and Apparatus for Indicating at Sub-Stations and Local Receivers Indications Transmitted from a Main Office or Observatory; and I do hereby declare that the following is a full and exact description thereof, reference being had to the accompanying drawings, making a part of this specification.

The object of this invention is to enable a single operator at a main station or observatory to simultaneously transmit by electric means to a series of sub-districts or sub-stations indications which are received or known at the main station and to automatically indicate such indications at the several sub-stations without the necessity of the presence of attendants at the sub-stations to receive the indications as they arrive.

The invention may be applied wherever it is desirable or expedient to transmit from one central location numerous indications simultaneously to a series of stations; but for the purposes of illustration and for convenience of description the invention will be described and set forth as applied to a system of transmitting thermometric indications by electric means, a system such as could be adapted, for example, to the uses of the Signal-Service Bureau of the United States Government. For the purposes of such a signal-service bureau the newly-invented system and apparatus would be as follows: At a main office—such as the city of Washington—thermometric indications are received from various localities in the United States. It is essential for the purposes of the service that these various indications should be transmitted to numerous other localities or stations which are in communication with the Washington office, but which are not in direct communication with the various localities the temperature of which should be known. Now, as applied to such a service, the invention consists in the instrumentalities whereby a single operator at the main or transmitting office simultaneously transmits, in succession, thermometric indications from a number of localities to a series of receiving sub-stations, and whereby the several indications transmitted are automatically and separately indicated in succession at each of the several receiving sub-stations.

In carrying out the objects of the invention the main transmitting office and each of the receiving sub-stations are provided with a series or set of electrical instruments for indicating thermometric indications, such as are ordinarily known as "thermoscopes." There are at each station as many thermoscopes as there are localities the temperatures of which are to be transmitted—that is, if the temperatures of Norfolk, Savannah, and Richmond, which are known at Washington, are to be simultaneously transmitted from Washington to a circuit of stations including Baltimore, Philadelphia, and New York, then for this particular circuit there would be placed at each of the places, Washington, (the central office,) Baltimore, Philadelphia, and New York, three receiving-thermoscopes for indicating the temperatures of Norfolk, Savannah, and Richmond, respectively. The receiving and indicating thermoscopes utilized for the purposes of this invention are of a well-known character and construction, such a thermoscope having an indicating-index which is adapted, by the opening and closing of electric circuits, to be turned step by step a certain predetermined distance in either direction, as the case may be, the distance of each step taken representing on a coacting dial a degree of temperature. In such thermoscopes, as is well known, the index is actuated in one direction by an electric current passing through one controlling-magnet and is actuated in the opposite direction by an electric current passing through another controlling-magnet. The two electric circuits for effecting these opposite movements are ordinarily called "increasing-temperature" and "decreasing-temperature" circuits, depending upon the direction in which the index is moved. When both circuits are idle, then the index is at rest, thus giving no record of temperature until the passage of an electric current through one of said circuits. In the present system there is used, in connection with these well-known instruments for transmitting the desired indications, a newly-invented apparatus and system of wire communication which is under the absolute control and manipulation of a single attendant or operator. Under the new system three line-wires or less are sufficient for the transmission of indications from an indefinite number of localities reporting at the main office, to an indefinite number of receiving-stations which obtain information from the main office. This result is effected by the employment at the main office and at each receiving sub-station, of a newly-invented instrument with proper manipulating-keys, by means of which the proper circuits of the several thermoscopes in succession may be brought into operative relation at the main office and the corresponding circuits of the thermoscopes at the various receiving sub-stations will be brought simultaneously into operative relation. This instrument I call a "multiple transmitter," and this, together with the necessary keys and connections, I denominate a "thermograph."

In connection with the system the invention also includes a system of verification and of verifying-instruments for securing correct transmission of the thermometric readings and for detecting any variations therefrom at the main transmitting office.

The system and apparatus constituting the invention are illustrated in the accompanying drawings, in which—

Figure 3:
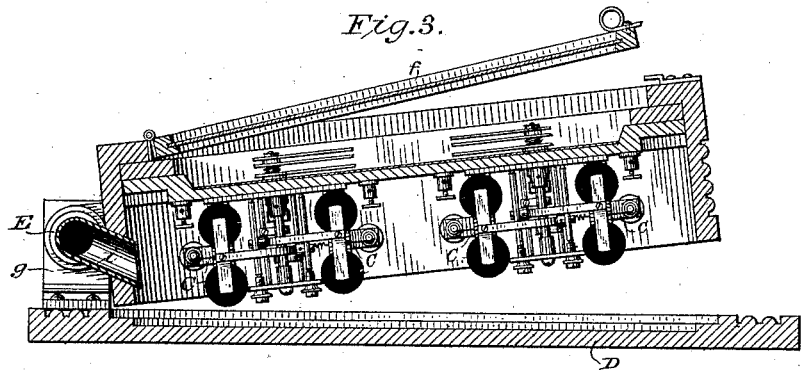
Figure 4:
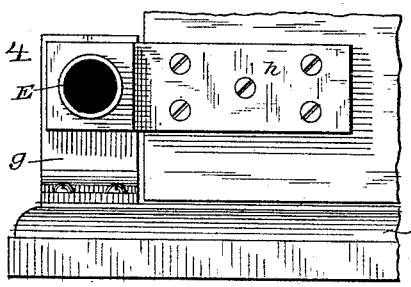
Figure 5:
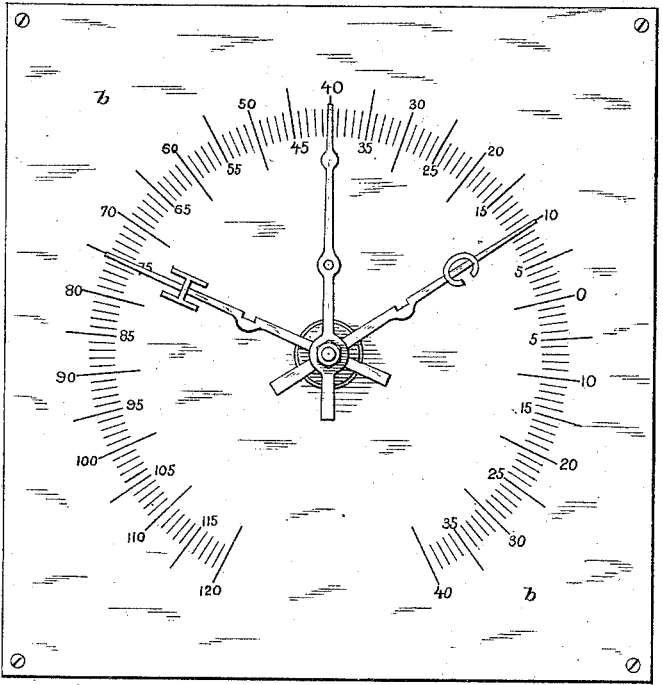
Figure 6:
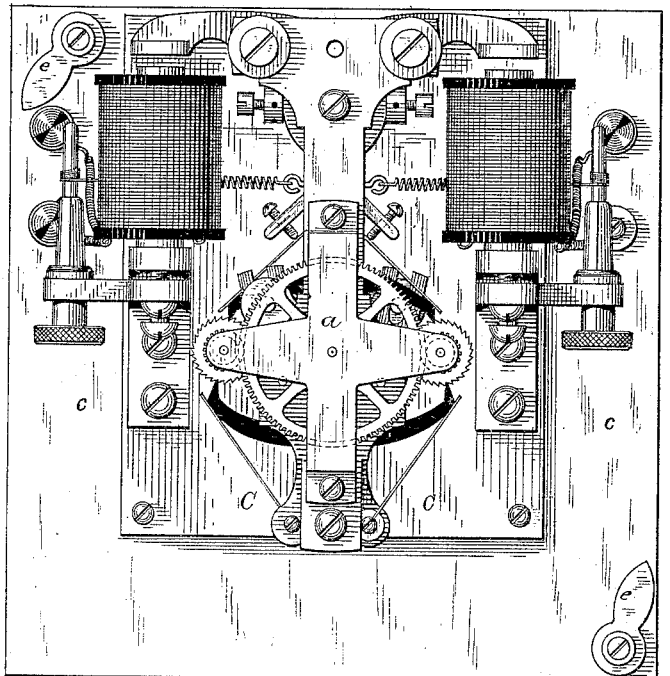
Figure 7:
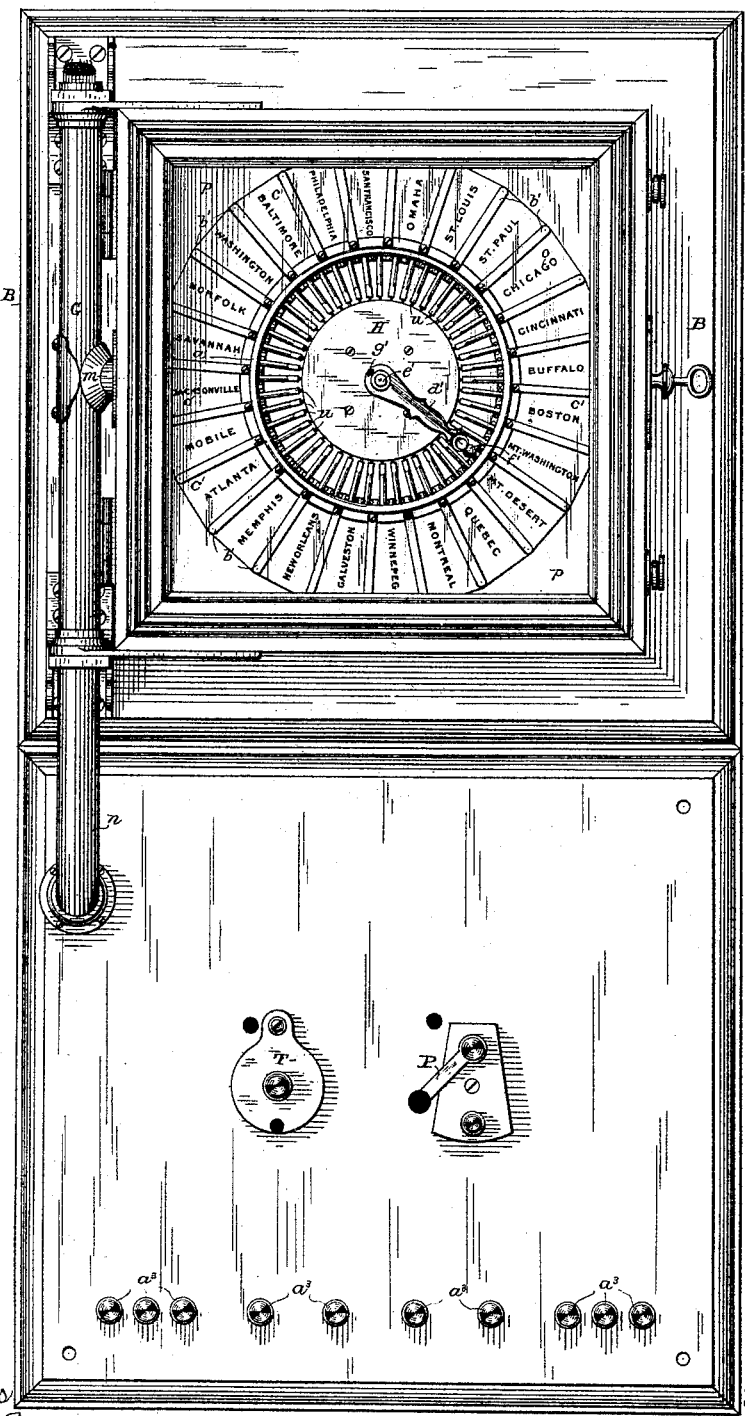
Figure 8:
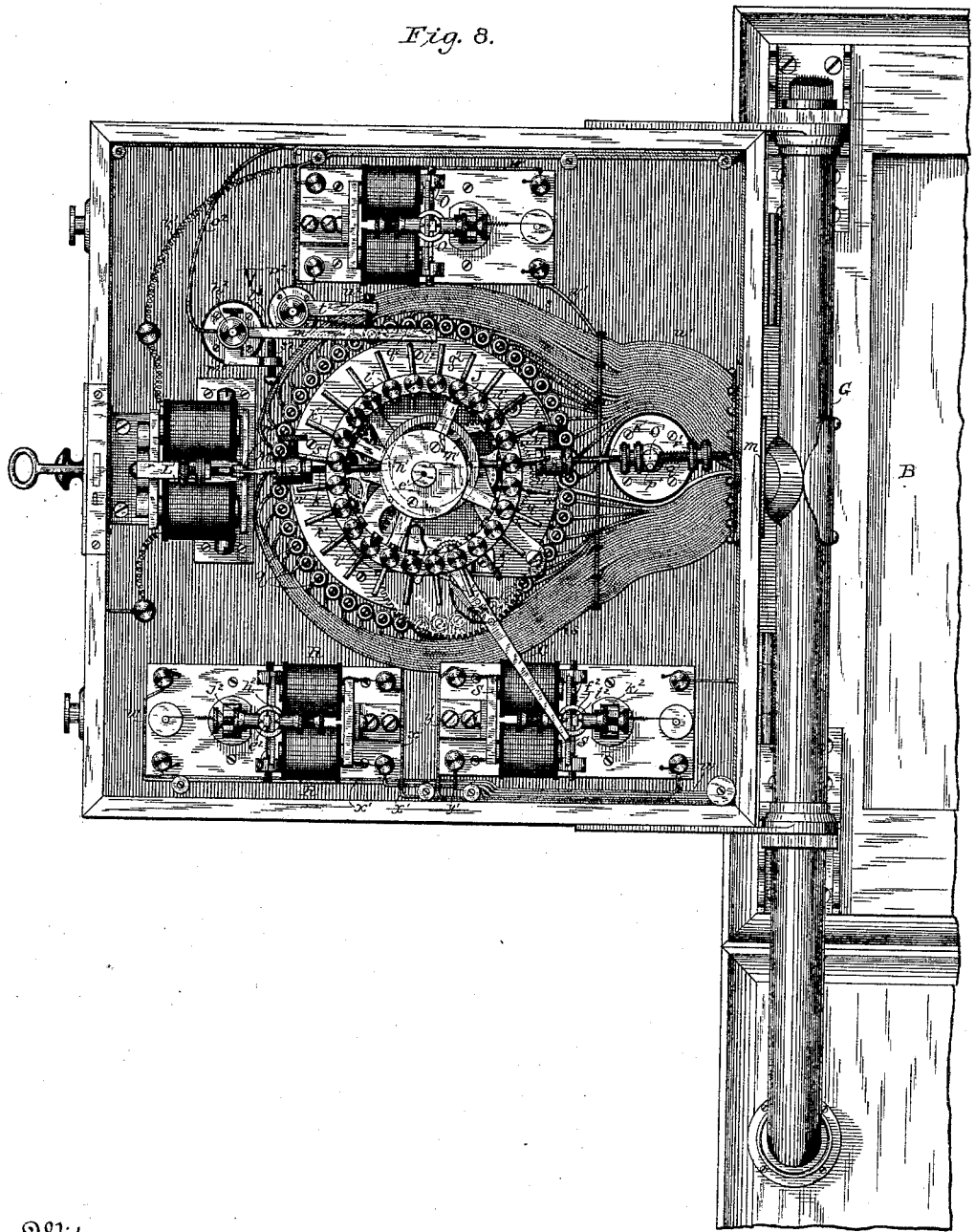
Figure 10:
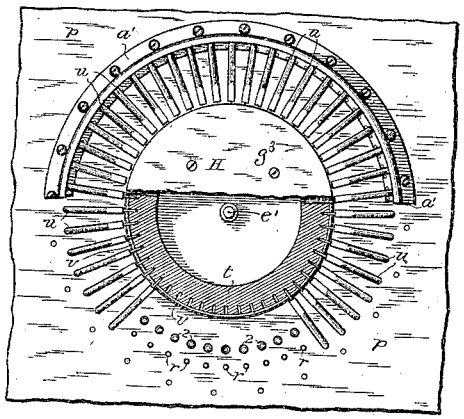
Figure 9:
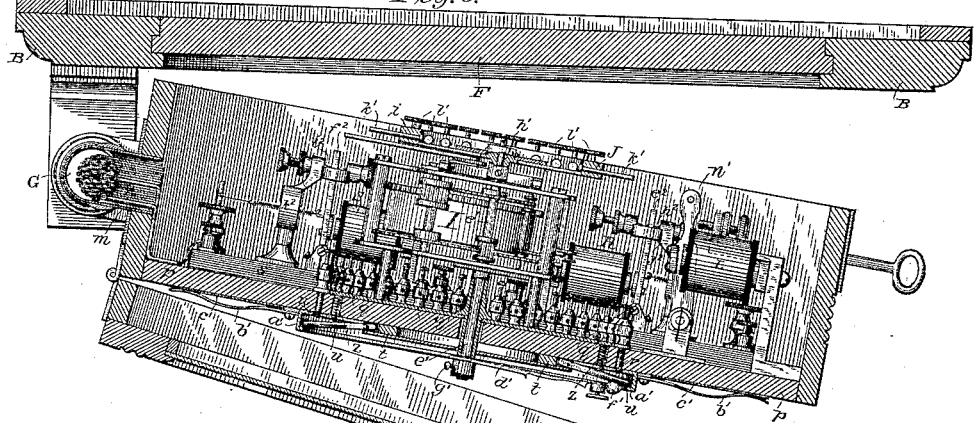
Figure 9A:
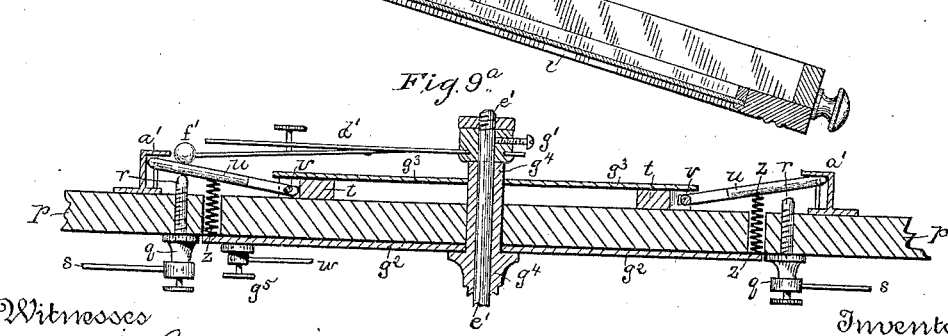
Figure 13:
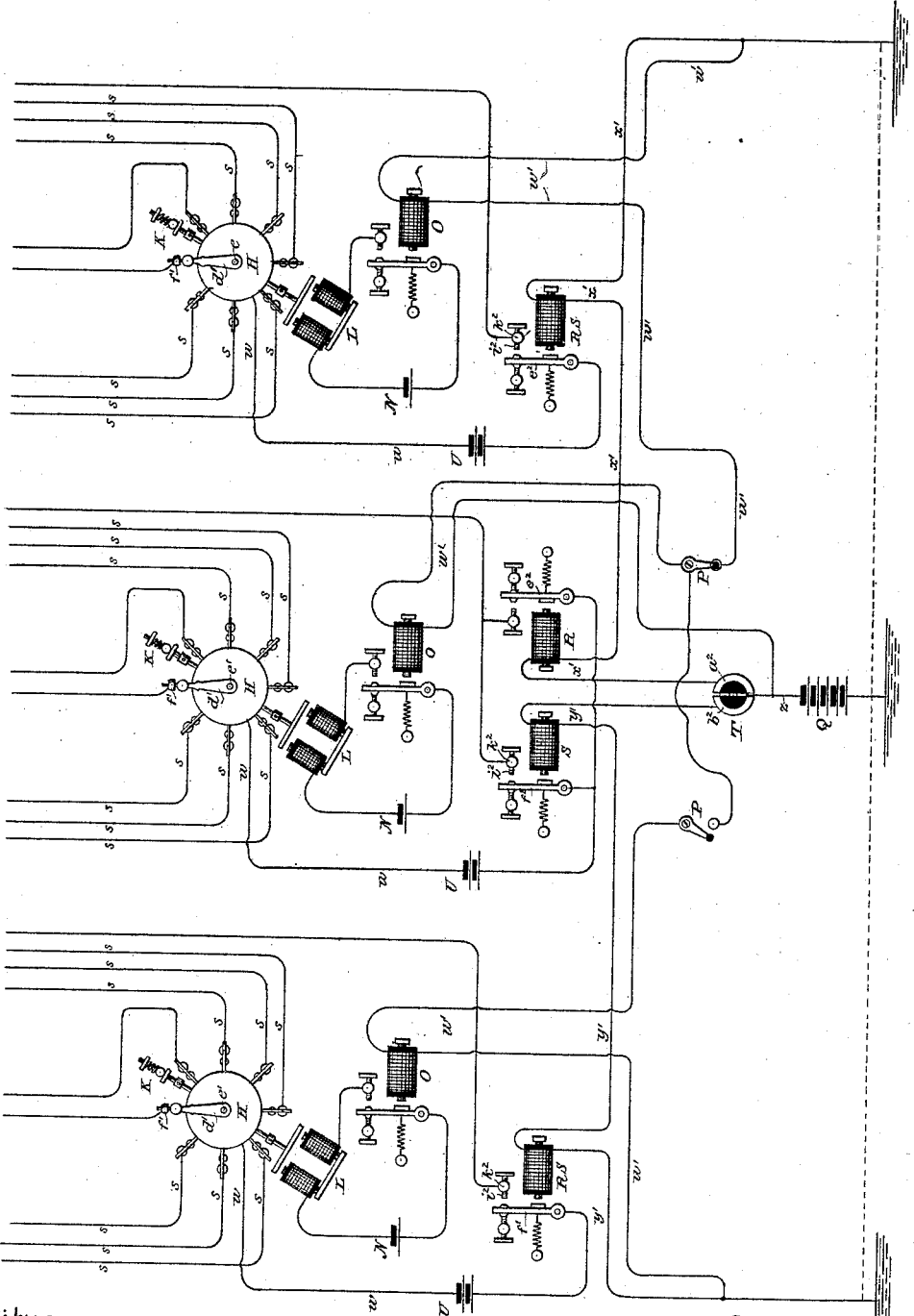
Figure 14:
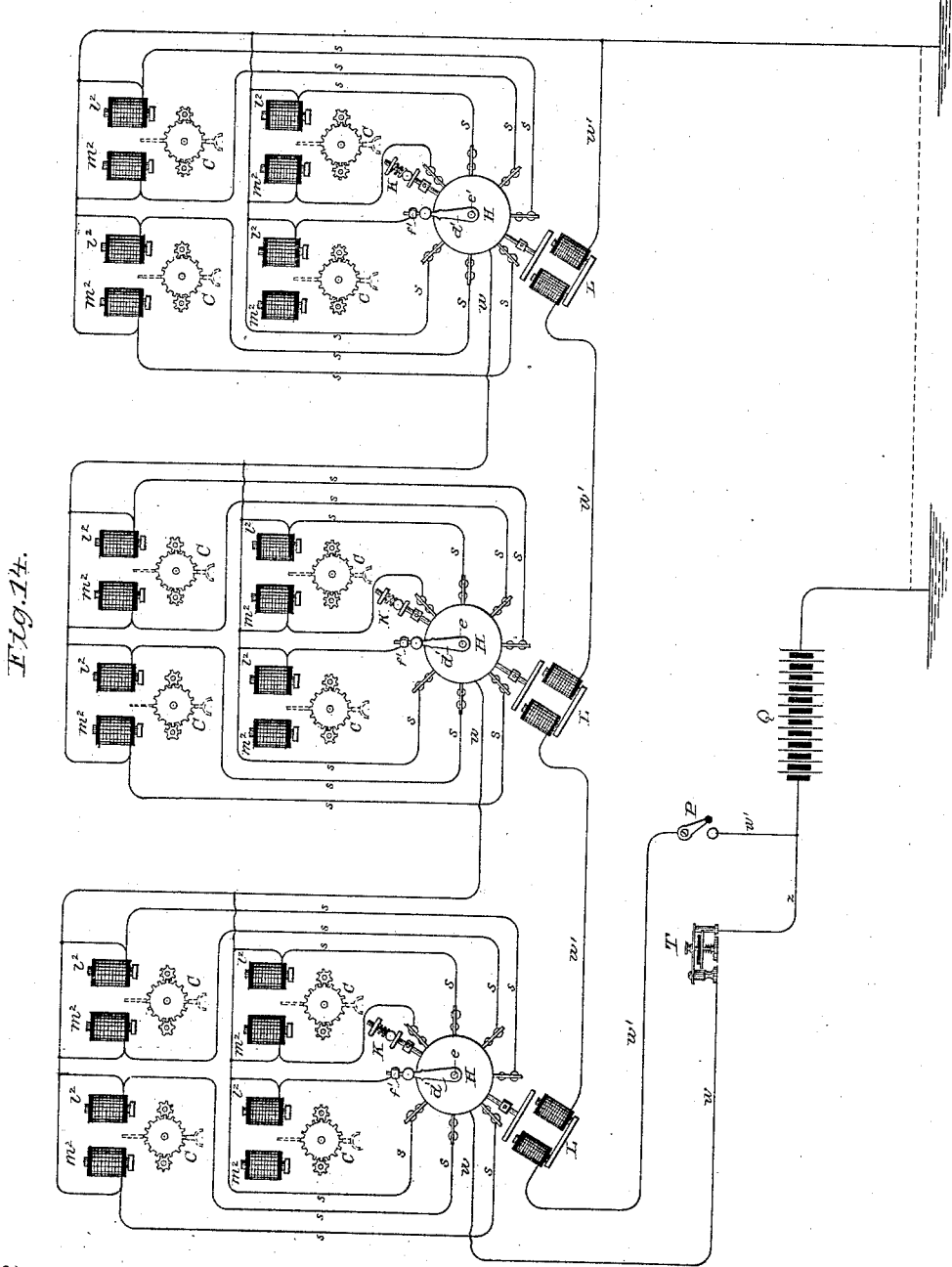
Figure 15:
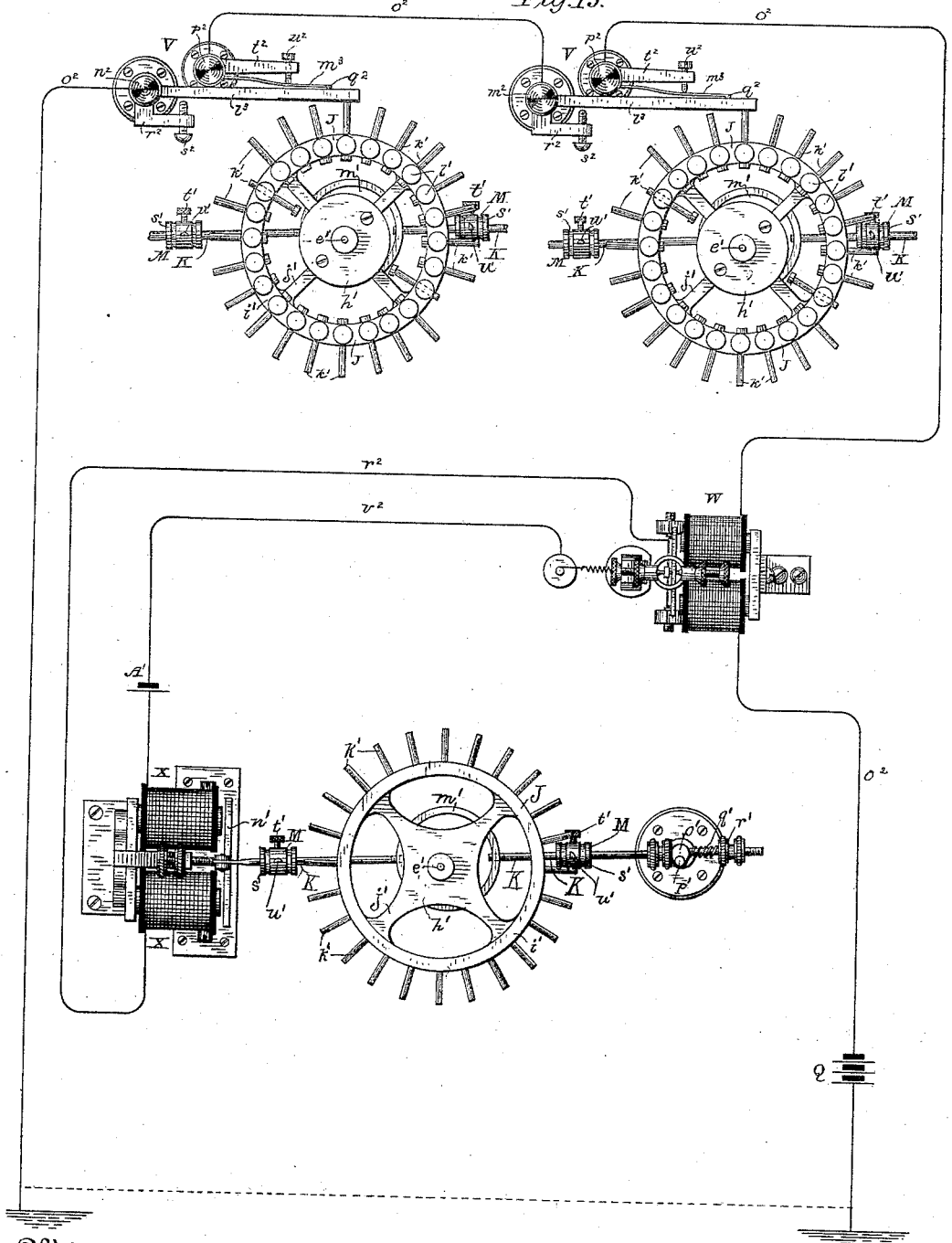
Figure 16:
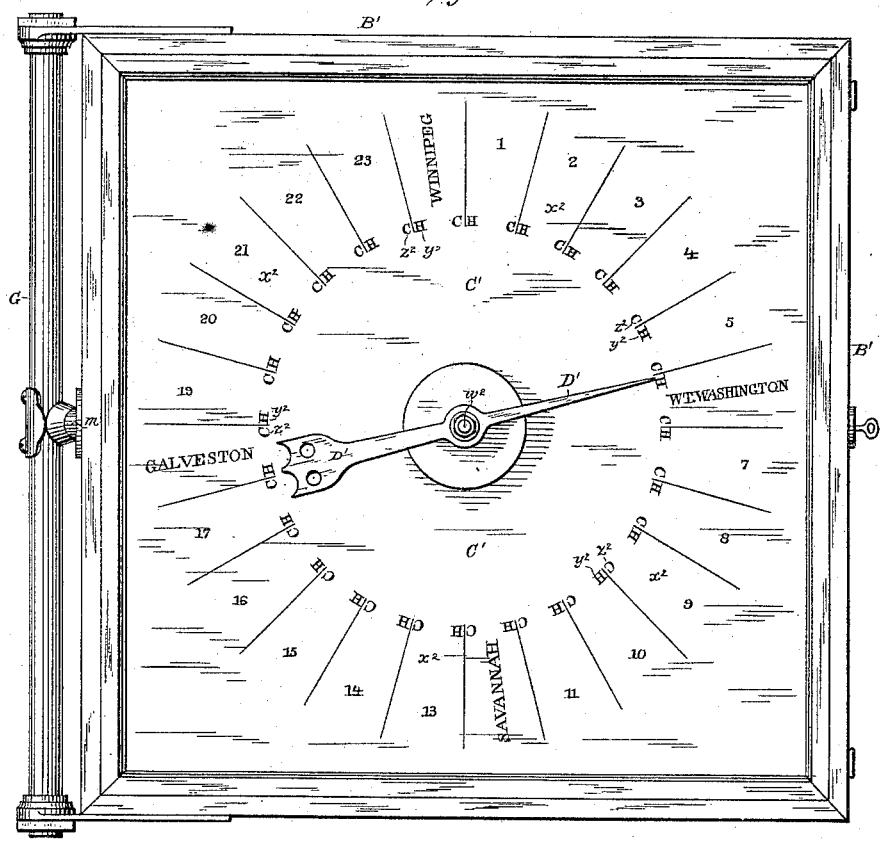
Figure 17:
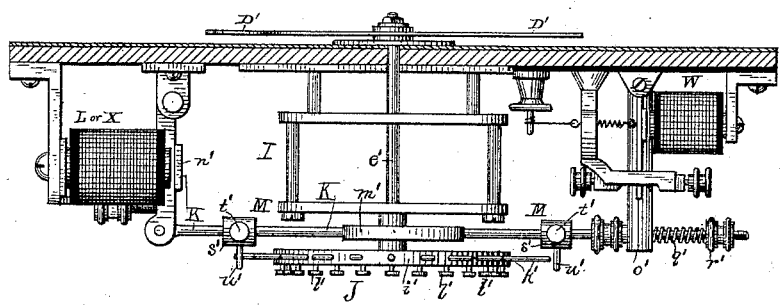

Figure 1 represents a front view of a case containing a group of four receiving or indicating thermoscopes and an attached case containing the multiple-transmitter and thermograph apparatus for transmitting thermometric indications, this combined apparatus being intended to illustrate the general arrangement in simple form; Fig. 2, a back view of the upper receiving-thermoscope case of the same apparatus; Fig. 3, a central transverse horizontal section of the same case, showing how the different parts of the case are united and hinged together; Fig. 4, a bottom view, on an enlarged scale, of one corner of the case, showing the construction of one kind of hinge used on the case; Fig. 5, a front or face view of one of the receiving-thermoscopes adapted to be used in such a holding and exhibiting case; Fig. 6, a back view of the said receiving-thermoscope; Fig. 7, a front view of the multiple transmitter and thermograph complete, representing it as constructed to distribute or transmit the thermoscopic indications of twenty-four reporting stations; Fig. 8, a back view of same, showing the main features of its construction; Fig. 9, a central transverse horizontal section of the same view, showing the hinged parts swung apart somewhat. Fig. 9ᵃ is a detail sectional view; Fig. 10, a detail view of the multiple-circuit closer forming a part of the same; Fig. 11, a front view of a case containing twenty-four receiving-thermoscopes corresponding with the multiple transmitter and thermograph exhibited in Figs. 7, 8, 9, and 10; Fig. 12, a diagram exhibiting a system of circuit-connections as used in connection with the multiple-transmitter and thermograph apparatus; Fig. 13, a diagram illustrating a modification of the system of circuit-connection used with the apparatus; Fig. 14, a diagram illustrating a further modification of the system of circuit-connection; Fig. 15, a view showing in detail the construction of the verifier and its connection with the main instrument; Fig. 16, a front view of the verifier; Fig. 17, a central horizontal section of the same.

Like letters designate corresponding parts in all of the figures.

Referring to the construction of the cases and the arrangement of the receiving-thermoscopes and the multiple transmitter and thermograph therein, I show an upper case A, in which are mounted the receiving-thermoscopes, and a lower case B, in which is mounted my said multiple transmitter and thermograph, hereinafter to be described. The two cases are represented as adjoined or constructed together, which, however, is not necessary nor always best or most convenient. The case A here shown is adapted to contain four receiving-thermoscopes C C C C, the index-hands for current temperature and for maximum and minimum temperatures and the temperature scale or dial in connection therewith being shown on this the front side of the case. The receiving and indicating thermoscopes represented as adapted to this case may be and are of well-known construction, being, in fact, substantially the same as those described, for example, in Letters Patent No. 376,149, granted to me January 10, 1888. I employ on the back side of the thermoscope a cross-bridge $a$, Fig. 6, to furnish bearings in which the journals of the gear and ratchet wheels of the thermoscope turn and to furnish mountings for other parts of the thermoscope. The construction and operation of these receiving-thermoscopes forming in themselves no part of my present invention, I make no further description of the same here, except to add that the square form of the face $b$, Fig. 5, and of the frame-block $c$, Fig. 6, is well adapted to the case A for receiving them, though I do not restrict the form thereto. In Fig. 2 of the drawings I show these blocks fitted into square apertures in a lattice-frame or board $d$, forming the main part of the frame. Simple buttons $e\ e$ are pivoted on the back side of this lattice-frame to hold the thermoscopes in the apertures. Thus any thermoscope may readily be removed from the case and replaced by another when desired. The case has a glass door $f$ (shown swung out a little in Fig. 3) to shield the front side thereof and inclose the dial-faces and the hands of the thermoscopes. There is also at the back of the main case a back case or close frame D, also shown swung away somewhat in the same figure. This back frame may be considered as the supporting-base of all when constructed as shown and to be secured to a wall or other support. To this back frame or base is hinged the main frame or case A by means of bearing-brackets $g\ g$, (see Figs. 1, 3, and 4,) secured to the said back frame or base near an upper and lower corner, respectively, and strap-hinges $h\ h$, secured to the upper and lower edges of the case A near corresponding corners and surrounding the tube E, the ends of which extend through and turn in the said bearing-brackets, all as shown in Figs. 2, 3, and 4, so that the tube may turn with the case A. This tube is an important feature connected with the case, since all the connecting-wires $x\ y$, which form the circuit-connection for all the thermoscopes in the case, are extended through this tube and through a T branch $i$, extending from the middle of the main tube. Thus the case may be swung around as much as required and the instruments put in and taken out at will without in the least disarranging or disturbing the wires. There is a removable or simply movable plate $j$ covering an opening in the side of the tube opposite to the T-branch tube for convenience in inserting wires through the tubes or taking them out. As the different wires $x\ x\ y\ y$ ($x\ x$ indicating increasing-temperature circuit-wires, and $y\ y$ indicating decreasing-temperature circuit-wires) diverge from the T-branch tube in the case they are severally attached to the proper thermoscopes, as shown in Fig. 2. In removing any thermoscope from the case its circuit-wires are first detached from their binding-posts on the instrument, and when any thermoscope is first or again inserted in the case the proper circuit-wires therefor are then attached to its proper binding-posts. As shown in Fig. 1, near each instrument is placed a card or tablet $k$, designating of what locality it is employed to indicate the temperature. The two upper instruments shown have their label-cards located beneath the respective instruments, and the two lower instruments have their label-cards located a little distance above the respective instruments. This arrangement illustrates how variations may be made in their positions.

The multiple-transmitter and thermograph case B is constructed with a glass door $l$ in front of the main case and a back F, to which the main case is hinged, in like manner to the construction of the case A, and those parts are hinged together in a similar manner, and in connection with a tube G, through which the circuit-wires are led, also with a T-branch tube $m$ for the wires, the same as above specified in regard to the case A. The circuit-wires, which extend through both cases, are extended down out of the lower end of the tube E, and thence into the upper end of the tube G. This tube also has a curved or bent elbow-tube $n$ at its lower end to lead the wires extending through this end of the main tube back into the main case B or to its rear side. Such a curved terminal tube may be used also at the upper end of the tube, if desired. In the front side of this case B is shown the face $p$ of my multiple transmitter H, constructed to receive the multiple-circuit wires from the four receiving and indicating thermoscopes shown in the case A, and there are cards or tablets $o\ o$ showing the names of the localities reporting at the main office whose temperatures are to be transmitted and recorded. The parts of the multiple transmitter shown in this view are respectively designated by like letters of reference corresponding to similar parts represented in Figs. 7, 8, 9, and 10, which show a larger instrument complete adapted to serve twenty-four receiving and indicating thermoscopes.

Referring now to the instrument represented in Figs. 7, 8, 9, and 10, I will first describe the multiple transmitter H proper. This part of the apparatus is located in the middle of the case B, and its purpose in general terms is to bring independently into the electric circuit that one of the receiving and indicating thermoscopes which is selected to indicate the temperature of that locality whose temperature is to be transmitted.

The operation of the multiple transmitter is controlled by an attendant, and when he desires to transmit to the sub-stations the thermometric indications received from one of the localities reporting at the main office he manipulates the multiple transmitter so as to bring into the electric circuit that thermoscope in the case A which is selected once for all to indicate the temperature of that particular locality. The case A is in full sight of the attendant and contains as many thermoscopes as there are reporting localities under the control of the multiple transmitter. Thus in case the multiple transmitter is arranged and constructed to enable it to transmit the indications of twenty-four reporting localities, as shown in Fig. 7, then a case having twenty-four thermoscopes, such as is shown in Fig. 11, would be arranged in electrical connection with the multiple transmitter and in the full sight of the attendant. For effecting this purpose the mechanism now to be described is employed. This mechanism is particularly illustrated in Figs. 7, 8, 9, 10, and the upper part of Fig. 15; but the lower part of Figs. 15 and 17, while intended particularly to illustrate the "verifier," also serve to illustrate the multiple-transmitting mechanism, since in their principal mechanical features the two mechanisms are identical. The parts composing the mechanism are mounted on a board or partition $p$ in the case. In the back of this board is inserted a series of binding-posts $q\ q$, arranged in a circular line and having points $r\ r$ (platinum-tipped) slightly projecting through the front side of the board, which is of insulating material, or the said binding-posts are insulated therein. There are twice as many of these binding-posts as there are localities to be reported and as there are indicating and receiving thermoscopes to be controlled by the thermograph, since there is to be both an increasing-temperature and a decreasing-temperature wire for each thermoscope, and the proper arrangement is for increasing and decreasing temperature binding-posts to alternate in succession around the circle. These circuit-wires $s\ s$ are respectively secured in the binding-posts and are extended therefrom, as shown in Fig. 8, to and out through the tube G of the case B, as above set forth. Then upon the front side of the board $p$, concentric with the binding-post, is secured an annular plate $t$, provided with a series of notches, in which a series of circuit-closing bars $u\ u$ are pivoted and extend outward radially therefrom, and adapted to bear near their outer ends on the respective tips of the binding-posts. These bars may be conveniently pivoted to the annular plate by a single wire $v$, stretched around in a peripheral groove of the plate and passed through pivot-holes in the bars. This annular plate $t$ is in metallic connection with the inner metallic plate $g^2$ of the multiple transmitter by means of the metal guard plate or cover $g^3$, which in turn is in electric contact with the metallic bearing $g^4$ of the spindle $e'$, which bearing in turn is in electric contact with the plate $g^2$. The plate $g^2$ carries a binding-post $g^5$, to which is secured a ground-wire $w$, leading to one pole of a battery or to the earth. Thus the annular plate $t$ is at all times in permanent electric connection with the wire $w$, so that when either one of the circuit-closing bars is brought into contact with the tip of the corresponding binding-post a circuit is closed through the circuit-wire held by the said binding-post $q$ and the increasing or decreasing temperature-magnet (as the case may be) of the distributing-thermoscope with which that circuit-wire is connected. The circuit-closing bars are normally held lifted away from and out of contact with the tips $r\ r$ of the binding-posts by light springs $z\ z$, located in the board $p$ and bearing outward against the respective bars. The upward movement of the free ends of the circuit-closing bars is limited by an annular flange-plate $a'$, having an inward raised flange or lip, under which the ends of the circuit-closing bars play up and down and against which they bear when pressed upward by their springs. To an outward flange of the same annular plate, as shown, also are conveniently secured a series of clip-plates or spring-fingers $b'\ b'$, under which, respectively, are held the edges of cards or tablets $c'\ c'$, containing the names of the places or localities whose temperatures are to be transmitted, so that the proper circuits of the corresponding receiving and recording thermoscopes are designated thereby. There are two circuit-closing bars $u\ u$ inward opposite to each card or tablet—one for the increasing and the other for the decreasing temperature-circuit belonging to the thermoscope designated. The circuit-closing bars are depressed one by one in succession by means of an arm $d'$, which is secured to a central spindle $e'$, turned by clock-work I, Fig. 9, driven by a spring or other motor. On this arm is placed a friction-roller $f'$, turning thereon and adapted to roll over and bear down upon the circuit-closing bars as the arm is turned around by the clock-work, and thereby to cause the bars to close their respective circuits while it bears thereon. The arm is secured and adjusted upon the central spindle by a set-screw $g'$ or equivalent means. The arm $d'$ is elastic, but sufficiently rigid to bear down the circuit-closing bars firmly upon the binding-post tips, while it yields sufficiently to pass over the bars by the impulse of the clock-work imparted to it. The arm serves also as a hand or index-pointer to point to the names on the tablets where it is to stop at different times.

Now the depressing-arm $d'$ is required to stop each time opposite to the name of the particular locality to be reported and at the increasing or decreasing temperature circuit of the corresponding distributing-thermoscope, as may be desired. I provide means for regulating the movement of the arm by electro-magnetic means completely under the control of the operator or attendant. For this purpose I employ an electro-magnetic escapement. (Shown in Figs. 8 and 9 and partly in detail in Fig. 15.) The designation of the several parts of this escapement and the functions and operation of the same are as follows: Upon the rear end of the central spindle $e'$ is secured an escapement-wheel J, which, as represented, is constructed with a central plate or hub $h'$, peripheral rim $i'$, and connecting-spokes $j'\ j'$. The rim $i'$ is made thick as well as of sufficient width, and it is perforated with a number of radial holes equal to the number of distributing-thermoscopes connected with the multiple transmitter of the apparatus and half as many as there are circuit-closing bars $u\ u$ belonging to the multiple transmitter. In these holes are placed a series of escapement-pins $k'\ k'$, which serve for teeth, as of an ordinary clock-escapement. These pins are secured in position by set-screws $l'\ l'$, screwed into the side of the rim against the pins. By this construction either all of the pins may be pushed out to project beyond the rim, as shown in Fig. 8, or any one or more of them may be drawn in next to the hub while the outer ends are still held in the rim, as shown in Fig. 15, in which position they do not act, and the escapement-wheel is not arrested when passing them. Therefore, in case any one or more of the full number of thermoscopes are wanting in the apparatus, the pin or pins of the escapement-wheel corresponding to such omitted thermoscope or thermoscopes will be pushed in out of action. In connection with this escapement-wheel I employ a reciprocating pallet-rod K, constructed and arranged in connection with an operating electro-magnet L substantially as follows: The pallet-rod is arranged diametrically across the escapement-wheel, as represented, near one side—the inner side, as shown. It has a ring or other form of opening $m'$ in the middle surrounding the spindle $e'$ of the clock-work driver, the size of the opening being sufficient to permit the reciprocation of the pallet-rod without striking the spindle. One end of the pallet-rod is pivoted or otherwise suitably attached to the movable end of the pivoted armature $n'$ of the electro-magnet L. Near the other end of the pallet-rod it slides in a bearing $o'$, (see Figs. 15 and 17,) represented as a post projecting from the board $p$. There is or may be a friction-roller $p'$ in the bearing, against which the rod slides to diminish friction. A counter-spring $q'$ is placed on the pallet-rod, adapted to bear against the bearing $o'$, while the other end of the spring bears against an adjustment nut or collar $r'$ to regulate the force of the spring, which is thus adapted to draw the pallet-rod in the direction opposite to the draft of the electro-magnet when the latter is demagnetized. There is another collar or nut on the pallet-rod on the inner side of the bearing $o'$ to limit the extent of the movement of the pallet-rod away from the electro-magnet, and a jam-nut is or may be applied to the adjusting nut or sleeve to secure it in any position. Upon the pallet-rod are secured two pallets M M, which are to act in connection with the pin on the escapement-wheel. These pallets are in the form of blocks $s'\ s'$, adjustable in position on the pallet-rod to suit the pins on the escapement-wheel, and secured in position by set-screws $t'\ t'$, as shown, and having pins $u'\ u'$ projecting across the plane of the escapement-wheel, as shown in Fig. 17. One pallet being on one side and the other pallet on the other side of the escapement-wheel, the arrangement is such that when the electro-magnet draws the pallet-rod in one direction the pallet on that side allows the escape of a pin on the escapement-wheel by it, while the other pallet engages with the next pin that comes to it, and vice versa. Thus not only does this escapement control the movements of the circuit-closing arm $d'$, but by it the arm can be made to stop at any circuit-closing bar desired, and either at the increasing or decreasing temperature bar, as hereinafter set forth.

The system of electro magnet, electric circuit, and battery-connection adapted to this multiple-transmitter apparatus will now be set forth.

In order to give sufficient power to the electro-magnet L, for actuating the pallet-rod K, its coils are placed in a short local circuit $v'$, in which is a local battery, (represented at N in Fig. 12, for instance.) This circuit therefore is closed and opened by a relay-magnet O, the circuit $w'$ of which may extend to any distance. This circuit is closed and opened by means of a circuit-closing key P, Fig. 7, mounted on the front part of the case B, as shown. Whenever the circuit is closed by this key, therefore, the relay-magnet O is magnetized, and the relay-circuit is thereby closed, whereby also the electro-magnet L is magnetized and the pallet-rod is drawn by its armature so as to allow one pin of the escapement-wheel to pass, and when the said key P is moved to open its circuit the local circuit is thereby opened and the pallet-rod is drawn by its counter-spring, thereby allowing another pin of the escapement-wheel to pass.

The diagram shown in Fig. 12 exhibits the whole system of circuit-connection, the receiving-thermoscopes C C of the distributing circuits and stations and the multiple transmitters H H of the principal and sub-stations being represented by conventional designs indicative of some of the principal points thereof to avoid complexity in the diagram. Referring now to this diagram for a representation of the mode of operating the multiple transmitter, the circuit-closing key P is represented at the bottom of the diagram near the left hand, and the circuit-wire $w'$ leads therefrom to the relay-magnet O of the multiple transmitter of the main apparatus and back to the main battery Q and to earth. It is therefore clearly shown in this diagram how the closing and opening of the circuit by the key P effects the operation of the multiple transmitter through the magnets L O and batteries N Q.

Referring now to Figs. 7, 8, 9, and 12, I will describe the additional parts of the apparatus which belong especially to the thermograph. There are located in the case B, in a convenient position near the lower part, as shown, two thermoscopic relays R S, the former for the increasing-temperature circuit and the latter for the decreasing-temperature circuit. Each magnet is in a separate circuit, as $x'$, for the increasing-temperature and $y'$ for the decreasing-temperature magnet. Both of these circuits lead to a circuit closer and breaker T—such, for instance, as the one patented to me January 24, 1888, No. 376,880—by which either circuit may be closed or opened at will. A single return-circuit $z'$ leads from this circuit closer and opener, and a battery is placed in this circuit. (Represented in Fig. 12 as the same battery Q as used to control the thermo-multiple by the circuit $w'$ and key P.) This circuit closer and breaker has an independent separate circuit-closing key for each circuit, as shown in Fig. 12, that for the circuit $x'$ being marked $a^2$ and the one for the circuit $y'$ being marked $b^2$ in the figure. In Fig. 7 the shield-plate $c^2$ is shown covering the keys $a^2\ b^2$. The armatures $e^2 f^2$ of the respective relays R S are adapted to close and open the single return-circuit $w$ of all the distributing-thermoscopes, going thence to a battery U and farther on to the inner plate $g^2$, Fig. 9, of the multiple transmitter, and through that plate by metallic connection to the ring-plate $t$ of the multiple transmitter, where the distributing-circuits are closed and opened. These armatures, when their respective electro-magnets are magnetized, are brought into contact with the adjustable contact-points $h^2$ $i^2$ in binding-posts $j^2 k^2$, which receive continuations of the return-circuit wire $w$, extended to all the receiving-thermoscopes, as indicated in the diagram. I represent four of these receiving-thermoscopes for each sub-district, and I have marked them to correspond with the four localities named in Fig 1. It will be observed that the respective increasing-temperature and decreasing-temperature magnets $l^2 m^2$ have circuit-wires running to the multiple transmitter, and that the circuit-closing arm of the multiple transmitter is at the position to close the decreasing-temperature circuit for the distributing-thermoscopes, which exhibits the temperature for Galveston. It will now be readily understood how the whole apparatus is to be manipulated and how its purposes are effected. Taking the instance of Galveston for an example, suppose the temperature of Galveston is to be reported from the main station where this apparatus is located. The circuit-closing arm $d'$ may happen to be left at any circuit-closing bar in the multiple transmitter. In Fig. 7 it is represented at Mount Desert station over the increasing-temperature bar. It may be supposed that the temperature at Galveston has lowered since the last report. The first thing to be done by the operator or attendant is to bring the circuit-closing arm of the multiple transmitter round to the decreasing-temperature circuit of the Galveston receiving-thermoscope, as shown in Fig. 12. This is done, as above set forth, by alternately closing and opening the relay-magnet circuit $w'$ with the key P, and thereby operating the escapement mechanism set forth until the said circuit is reached by the arm. This temperature-decreasing circuit of Galveston is hence closed and all the others are opened. Then the thermograph circuit closer and opener T is brought into action by alternately closing and opening the said Galveston circuit with the key $b^2$ of the said circuit closer and opener until the attendant sees that the correct temperature on the dial is reached. All the other localities are transmitted in the same manner whenever the temperatures of the same are reported at the main office.

I have so far described the connection of the multiple transmitter and thermograph apparatus with the receiving-thermoscope at the main station. It remains to be set forth how the indications are transmitted to the local receiving-stations, and the means for effecting this are also illustrated in Fig. 12. This diagram illustrates the main transmitting-station at the left and two receiving-stations at the center and right. In each of these two receiving-stations there is another multiple transmitter H, with its escapement and relay electro-magnets L and O, and also relay-magnets R S, forming parts of the thermograph mechanism, all substantially the same as at the main receiving-station or observatory; but there is no multiple transmitter-key nor thermograph circuit closing and opening device in either sub-district, all the instruments therein being manipulated by the one operator or attendant at the main station and through the single key P and circuit closing and opening device T, represented and described as at the main station. The thermo-multiples of the different districts are brought into unity of action by extending the circuit-wire $w'$ to all the relay-magnets O O O in the several districts, as shown in the diagram. Thus with one key P all the multiple transmitters are worked in unison and their several circuit-closing arms $d'$ $d'$ $d'$ $d'$ will stop on corresponding circuits. Then to connect the thermograph circuit closer and opener T with the other district apparatus the circuits $x'$ $y'$, passing through the relay R S, are extended to the corresponding relays R S in the other districts. Each district has its own separate local escapement-battery N and distributing-thermoscope battery U. The main battery Q at the main station serves for the multiple-transmitter and thermograph circuit closing and opening for all the districts, there being a return earth portion of the circuit, as represented, or air portion, as shown by dotted lines in the diagram.

In the diagram Fig. 13 I show a modification of the circuit system connecting the multiple transmitter, by which I dispense with one temperature-relay in each sub-district apparatus and one circuit leading to the same. In this diagram I show only the multiple-transmitter and thermographic apparatus and the circuit-connections therewith and omit a representation of the distributing-thermoscopes themselves. Here the main district-station is shown in the middle of the diagram and a distributing district-station on each side. I show separate multiple-transmitter circuits $w'$ $w'$ and separate multiple-transmitter keys P P, one for the right and the other for the left district or districts. The apparatus for the main station is the same as in the diagram Fig. 12; but instead of having two temperature-relays, as R S, in the main apparatus, each sub-district apparatus has only a single relay marked with two letters R S to indicate that it performs the function both of an increasing and a decreasing temperature relay. Only one relay-magnet R S is necessary, since the proper circuit is determined exclusively by the position of the arm $d'$ of the multiple transmitter, and whether a decreasing or increasing temperature is to be transmitted and indicated is determined by the arm $d'$. The object of the relay-magnet R S is to make and break a circuit passing through one of the indicating-thermoscopes, and whether or not that circuit is an increasing one or a decreasing one is determined by the arm $d'$, and not by the relay R S.

In Fig. 14 I show a diagram illustrating still another modification of the system of circuit-connection adapted to sub-districts and stations which are little distant from each other, so as to dispense with relays and work with one battery sufficiently strong for all the purposes of the apparatus. Three districts are shown, as in the other diagrams, with similar multiple-transmitter and receiving thermoscopes. A single or main battery Q is used; but the multiple-transmitter circuit $w'$, controlled by the key P, goes direct to the magnet L of the multiple-transmitter escapement, and the thermograph circuit closer and opener T is in the return-circuit $w$ of the receiving-thermoscopes C C. Both the circuits $w'$ and $w$ go to the same battery Q and to earth.

In Fig. 15, in connection with Fig. 8, I show the construction and means of operation in connection with the multiple transmitter and thermograph of the verifier, which I proceed now to describe. In Fig. 8 I show an automatic circuit closing and opening device V, adapted to be operated by the escapement-wheel J of the multiple transmitter of the apparatus. This device consists, first, of a vibratory circuit-closing arm $l^3$, against which the successive pins $k'$ $k'$ of the multiple-escapement wheel J strike to vibrate the same. The means for closing and opening the verifier-circuit by the vibration of this arm, as represented, is with a contact-spring $m^3$. The vibratory arm $l^3$ is mounted on a post or bearing $n^2$, to which one part of the verifier-circuit wire $o^2$ is attached, and the contact-spring is secured to another post or support $p^2$, to which the other part of the said verifier-circuit wire is attached, the two posts of course being insulated from each other. The arm $l^3$ has a platinum or incorrodible contact-point $q^2$ to strike the contact-spring when the arm is raised by the pins of the escapement-wheel. There is a fixed arm $r^2$ projecting from the post $n^2$ or other support and provided with an adjusting-screw $s^2$ to limit the descent of the vibratory arm $l^3$, and another fixed arm $t^2$ projecting from the post $p^2$ or other support and provided with an adjusting-screw $u^2$ to adjust the position of the contact-spring $m^3$. The drawings show clearly the arrangement of these several parts. The closing and opening of this verifier-circuit operates a relay-magnet W, the coils of which are in the circuit. This relay-magnet correspondingly closes and opens the local circuit $v^2$, in which are the coils of the verifier-escapement magnet X, Figs. 15 and 17. Referring now to Fig. 15, I show in connection with the said magnet X (which corresponds with the magnet L of the multiple transmitter) a pallet-rod K and escapement-wheel J, corresponding with the similar parts of the multiple transmitter, and this is intended to indicate that the verifier-escapement is constructed to operate in the same manner as the multiple-transmitter escapement, so that its indications correspond with those of the said multiple transmitter— that is, its index arm or hand should correspond in position with the circuit-closing arm of the multiple transmitter. If it does not at any time, then it is to be inferred that there is some disarrangement of the transmission which is to be corrected. The corrections are made by an attendant opening the cases and manually moving the index arms or hands to their proper positions. The verifier-circuit is to extend to the escapements of the sub-districts connected with the main station or observatory, as above set forth.

I indicate in Fig. 15 two multiple-transmitter escapement-wheels J J, each connected with a verifier-circuit closer and opener, as above described, both in the same verifier circuit $o^2$, one being supposed to be at a sub-district station to indicate the connection of the multiple-transmitter apparatus with the verifier. The main battery Q may serve to furnish the electric current for the verifier-circuit, as indicated in Fig. 15, though a separate battery may be used. The verifier local circuit $v^2$ has a local battery A'.

The verifier indicator and escapement device may be in the same case as the multiple-transmitter and thermograph apparatus or it may be in a separate case.

In Figs. 16 and 17 I show the verifier and escapement device in a separate case B', having the same general construction as the case B of the main apparatus. In Fig. 16 a suitable dial-face C' is shown with an index arm or hand D' mounted on the spindle $e'$ of the clock-work mechanism I, Fig. 17. I show the dial-face divided into twenty-four divisions $x^2$, corresponding with the twenty-four stations represented in Fig. 7, and each division has two points $y^2$ $z^2$, representing the increasing and decreasing temperature positions, respectively. These divisions may be marked with the names of the stations, as I show in four of them; but they may be indicated by simple numbers, as shown in the other divisions. The other parts of the verifier-escapement in Fig. 17 are designated, respectively, by letters corresponding with those of the multiple transmitter.

The operation of the verifier in detecting errors of transmission or in the working of the instruments at a number of stations is indicated in Fig. 15. In this figure the multiple-transmitters of two stations (the main and one local station) are shown, and it is evident that by connecting the multiple transmitters in series any number of them at any number of required stations may be brought into co-operation with the single verifier at the main station. Of the two multiple transmitters shown at the top of Fig. 15 the one at the right is that of the main station and the other is one at a local station. Now, in order that the circuit through the wires $o^2$ and the battery Q may be operated and so operate the local circuit controlling the verifier, it is evident that both multiple transmitters must operate in unison, since they are arranged in series. If they operate in unison, then the indications of the verifier will always correspond with those of the multiple transmitter at the main office. If they do not operate in unison—that is, if any one of the multiple transmitters throughout the series fails to move (as it might, for example, if its clockwork ran down)—then the verifier would also fail to operate and there would be a variance between the indications of the verifier and the multiple transmitter at the main office.

In Fig. 8 I show a ratchet-arm G' for winding up the clock-work mechanism with the multiple-transmitter escapement. Any other means may be employed—as, for instance, a common clock-key.

In Figs. 1 and 7 I show binding-posts $a^3 a^3$ for attaching the various circuit-wires, which are designated in Fig. 1 by the proper letters, thereby indicating their relative positions to one another in the case.

For convenience of description and illustration the foregoing specification has set forth the invention as applied to the transmission of thermometric indications. It will be obvious, however, that as far as thermometric indications are concerned the only portions of the mechanism which are necessarily confined thereto are the scales or readings on the indicating-instruments. By simply substituting other scales or readings on the dials of the indicating-instruments the apparatus and system are equally applicable to the transmission and indication of any information capable of being rendered intelligible by the movements of an index on a properly-marked dial. The gist of the invention thus lies in a system and apparatus for controlling index movements, and the invention is not limited to the transmission and indication of any particular information, such as thermometric indications.

I claim as my invention—

1. A case A or B, electrical instruments mounted in said case, circuit-wires connected with said instruments, and a hinged door for closing the case, in combination with a tube E, concentric with the hinge of the door, through which tube the said circuit-wires are extended into the case, substantially as set forth.

2. In combination with a case, as A or B, a circuit-tube E, arranged concentric with the hinges of the case-door and provided with a T branch through which the circuit-wires are led from the tube to the interior of the case, substantially as set forth.

3. In combination with a case and its door, a circuit-wire tube E, arranged concentric to the hinges of the case-door, and the strap-hinges $h\ h$ of the door surrounding the tube, substantially as set forth.

4. The combination of a series of electric-circuit wires $s\ s$, tips $r\ r$, forming continuations of the wire-circuits and serving as circuit-closing electrodes, circuit-closing bars $u\ u$, having a circuit closing and opening movement to and from the said electrodes, means, as springs $z\ z$, for automatically separating the said bars from the electrodes, and an arm $d'$, adapted to move over the said bars successively and to close their circuits in succession while passing over or bearing thereon, substantially as set forth.

5. In combination with the circuit-closing bars $u\ u$ and their circuit-closing tips $r\ r$, the flange-plate $a'$, having an inward flange against which the said bars are held away from their circuit-closing tips and having an outward flange, and card or tablet holding tips secured to said outward flange of the said flange-plate, substantially as set forth.

6. The combination of the circuit-closing bars $u\ u$, a notched annular plate $t$, to which the said bars are pivoted, pivot-wire $v$, stretched around the said plate, and the return-circuit wire $w$, having electro-conducting connection with said plate, substantially as set forth.

7. In combination with the circuit-closing arm $d'$, clock-work spindle $c'$, on which the said arm is mounted, a clock-work mechanism actuating said spindle, an escapement-wheel J, mounted on the said spindle $c'$, pallets co-operating with said escapement-wheel, and means for actuating said pallets, substantially as set forth.

8. The combination of the clock-work, the escapement-wheel thereof having projecting radial pins, a circuit-closer moved by said clock-work, the reciprocating pallet-rod having pallet-pins projecting therefrom, adapted to engage alternately with the pins of the escapement-wheel, and an electro-magnet actuating said pallet-rod, substantially as set forth.

9. In combination with the reciprocating pallet-rod K and its pallet-pins, the escapement-wheel J, provided with escapement-pins K' K' and constructed with a radially-perforated rim $i'$, in which the said pins are adjustable to bring them into or out of engagement with the pallet-pins of the pallet-rod, substantially as set forth.

10. The combination of a clock-work, the escapement-wheel thereof, an electric-circuit closer moved by said clock-work, a reciprocating pallet-rod co-operating with said escapement-wheel, an armature to which said pallet-rod is pivoted, the electro-magnet of said armature, and a counter-spring acting on said pallet-rod to move the same away from said magnet, substantially as set forth.

11. The combination of the escapement-wheel J, pallet-rod K, electro-magnet L, armature $n'$, bearing $o$, friction-roller $p'$, counter-spring $q'$, and adjustable nut or collar $r'$, substantially as set forth.

12. The combination of the escapement-wheel J, pallet-rod K, electro-magnet L and its armature $n'$, local-battery circuit $r'$, local battery N, relay-magnet $o$, relay-magnet circuit $w'$, circuit-closing key P, and a battery, as Q, substantially as set forth.

13. The combination of the vibratory arm $l^3$, contact-spring $m^3$, post $n^2$, wire $o^2$, post $p^2$, fixed arm $r^2$, adjusting-screw $s^2$, fixed arm $l^2$, and adjusting-screw $u^2$, substantially as set forth.

14. The following specified instruments and circuits in combination, to wit: (a) a plurality of multiple transmitters, one at each of several stations, each multiple transmitter having a plurality of fixed and insulated electrodes, a movable circuit-closer having an intermittent step-by-step movement, whereby it is brought successively into contact with said electrodes one by one, and an electro-magnet which controls the step-by-step movement of said circuit-closer; (b) a plurality of electric indicating-instruments at each of said several stations, whereby there is a plurality of such instruments for each of said multiple transmitters, each of said indicating-instruments having an actuating electro-magnet, (or magnets,) the said actuating-magnets being connected, respectively, with the electrodes of the multiple transmitter at the same station, one magnet being connected with one electrode, thus connecting the indicating-instruments with the multiple transmitter in multiple; (c) electric-circuit connections connecting in series the actuating electro-magnets of all of the multiple transmitters at the several stations and hand-operated means for making and breaking the said circuit, whereby intermittent electric currents are simultaneously sent around (or through) the actuating electro-magnets of the several multiple transmitters, thereby causing their several circuit-closers to move in unison and bringing at the several stations corresponding electric indicating-instruments into electric connection with the circuit-closers, respectively, and (d) electric-circuit connections between said indicating-instruments, said circuit-closers, and a suitable source of electric energy, and hand-operated means for controlling said circuit-connections, whereby intermittent electric currents are simultaneously sent around (or through) the actuating electro-magnets of those indicating-instruments at the several stations which are in connection with the circuit-closers of the multiple transmitters, thereby causing one indicating-instrument at each station to operate in unison with one indicating-instrument at each of all of the other stations, substantially as set forth.

15. A plurality of multiple transmitters, one at each of several stations, each of said transmitters having a plurality of fixed and insulated electrodes, a circuit-closer which constitutes a part of an electric circuit, said circuit-closer having an intermittent step-by-step movement, whereby it is brought successively into contact with said electrodes one by one, and an electro-magnet which controls the intermittent step-by-step movement of said circuit-closer, in combination with a plurality of electric-indicating instruments at each of said stations connected in multiple with the electrodes of the multiple transmitter at the same station, an electric generator, one pole of which is connected with said indicating-instruments and the other pole of which is connected with the circuit-closer of the transmitter, and hand-operated electrical means for operating in unison the electro-magnets which control said circuit-closers, and independent hand-operated electrical means for simultaneously controlling the action of such of the indicating-instruments at the several stations as are brought in circuit by the multiple transmitters, substantially as set forth.

16. A plurality of multiple transmitters, one at each of several stations, each of said multiple transmitters comprising a plurality of fixed and insulated electrodes, a circuit-closer having a step-by-step movement and adapted to bring said fixed electrodes one by one into an electric circuit of which said circuit-closer is a part, an actuating electro-magnet controlling the step-by-step movement of said circuit-closer, a main multiple-transmitter electric circuit connecting said multiple transmitters in series, and hand-operated means for opening and closing said main electric circuit, in combination with a plurality of electric indicating-instruments at each of said stations connected in multiple with the fixed electrodes of the multiple transmitter at the same station, a single indicating electric circuit (independent of said multiple-transmitter circuit) connecting the several stations in series and simultaneously controlling the action of such of the indicating-instruments as are brought simultaneously in circuit by the action of said multiple transmitters, and hand-operated means for opening and closing said indicating electric circuit independently of the opening and closing of said multiple-transmitter circuit, substantially as set forth.

17. A plurality of multiple transmitters, one at each of several stations, each of said transmitters comprising a plurality of fixed electrodes, a circuit-closer having a step-by-step movement and adapted to bring said fixed electrodes into electric connection with one pole of a local electric generator U, an actuating electro-magnet controlling the step-by-step movement of said circuit-closer, a main electric circuit connecting said multiple transmitters in series, and means for opening and closing said main electric circuit, in combination with a plurality of electric indicating-instruments at each of said stations, said indicating-instruments at one station being all in electric connection by means of a local circuit with the opposite pole of said local generator U, and electric-circuit wires connecting said instruments with the several fixed electrodes, respectively, of the multiple transmitter at the same station, local means, such as a relay-magnet, at each station for making and breaking each local circuit, an electric circuit connecting all of said relay-magnets at the several stations in series, and means for making and breaking said electric circuit, substantially as set forth.

18. A plurality of multiple transmitters, one at each of several stations, each of said transmitters comprising a plurality of fixed electrodes, a circuit-closer having a step-by-step movement and adapted to bring said fixed electrodes into electric connection with one pole of a local electric generator U, an actuating electro-magnet L, controlling the step-by-step movement of said circuit-closer, a local electric generator N, a local electric circuit including said local generator N and said magnet L, means, such as a relay-magnet O, for opening and closing said local circuit, an electric circuit including an electric generator and connecting the relays O at all of the stations in series, and means for opening and closing said circuit, in combination with a plurality of electric indicating-instruments at each of said stations, said instruments at each station being connected in multiple with the generator U and with the fixed electrodes of the multiple transmitter at the same station, means, such as a relay-magnet R S (or RS) for opening and closing the local circuit $w$ at each station, which includes said generator U, an electric circuit including an electric generator and connecting the relays in the local circuits $w$ at all of the stations in series, and means (independent of the means which control the relays O) for opening and closing said circuit, substantially as set forth.

19. The circuit-closer of a multiple transmitter having a step-by-step movement, a verifying electric circuit $o^2$, and a circuit opener and closer in said circuit actuated at each movement of said circuit-closer of the multiple transmitter, in combination with a verifier-instrument having an index capable of a step-by-step movement, clock-work mechanism for actuating said index, the escapement-wheel on said clock-work mechanism, a pallet-rod co-operating with said clock-work mechanism, an escapement electro-magnet controlling said pallet-rod, an electric circuit $v^2$, passing through said escapement-magnet, and an electro-magnet for opening and closing said circuit $v^2$, said electro-magnet being located in said circuit $o^2$, substantially as set forth.

20. A plurality of multiple transmitters, each having a circuit-closer having a step-by-step movement, a verifying electric circuit $o^2$, connecting all of said multiple transmitters in series, and circuit openers and closers in said circuit $o^2$ at each multiple transmitter, said circuit openers and closers operating synchronously with the step-by-step moving circuit-closers of each multiple transmitter, respectively, in combination with a single verifying-instrument having an index capable of a step-by-step movement, and an electro-magnet in said circuit $o^2$, controlling the movement of said index, substantially as set forth.

21. The escapement-wheel of a multiple transmitter having radially-projecting pins, a fixed electric contact or electrode, and a vibrating circuit-controlling lever actuated by said pins, whereby it is brought into electric connection with said contact or electrode, in combination with electric circuits the wires of which lead from said fixed electrode and lever, respectively, and a verifying-instrument having an index the movements of which are controlled by the making and breaking of said electric circuit, substantially as set forth.

In witness whereof I have hereunto signed my name in the presence of two subscribing witnesses.

HENRY JANSEN HAIGHT.

Witnesses:
C. S. NEWELL,
MANLEY A. RAYMOND.